(12) United States Patent
Tsui et al.

(10) Patent No.: US 9,002,410 B2
(45) Date of Patent: Apr. 7, 2015

(54) METHOD AND APPARATUS FOR CREATING, USING, AND DISSEMINATING CUSTOMIZED AUDIO/VIDEO CLIPS

(75) Inventors: Daren Tsui, San Carlos, CA (US); Edwin Ho, Palo Alto, CA (US); King Sun Wai, Fremont, CA (US); Arthur Okada, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1387 days.

(21) Appl. No.: 12/167,860

(22) Filed: Jul. 3, 2008

(65) Prior Publication Data

US 2009/0042622 A1   Feb. 12, 2009

Related U.S. Application Data

(60) Provisional application No. 60/954,268, filed on Aug. 6, 2007.

(51) Int. Cl.
| | | |
|---|---|---|
| *H04B 1/38* | (2006.01) | |
| *H04M 1/00* | (2006.01) | |
| *H04M 19/04* | (2006.01) | |
| *H04M 1/725* | (2006.01) | |

(52) U.S. Cl.
CPC ............ *H04M 19/04* (2013.01); *H04M 1/7253* (2013.01); *H04M 1/72558* (2013.01); *H04M 2250/64* (2013.01)

(58) Field of Classification Search
USPC .......... 379/88.11, 88.19, 88.25, 88.22, 88.23; 455/567, 414.1, 415, 418
See application file for complete search history.

(56) References Cited

U.S. PATENT DOCUMENTS

| | | | |
|---|---|---|---|
| 4,686,699 A | 8/1987 | Wilkie | |
| 5,349,635 A | 9/1994 | Scott | |
| 5,475,741 A | 12/1995 | Davis et al. | |
| 5,684,825 A | 11/1997 | Ko | |
| 5,926,537 A | 7/1999 | Birze | |
| 6,061,340 A | 5/2000 | Albrow et al. | |
| 6,094,587 A | 7/2000 | Armanto et al. | |
| 6,308,086 B1 | 10/2001 | Yoshino | |
| 6,714,637 B1 | 3/2004 | Kredo | |
| 6,778,648 B1 | 8/2004 | Alston et al. | |
| 7,020,497 B2 | 3/2006 | Deeds | |
| 7,136,679 B2 | 11/2006 | Beauford | |
| 7,233,658 B2 | 6/2007 | Koser et al. | |
| 7,340,049 B2 | 3/2008 | Batni et al. | |
| 7,349,383 B2 | 3/2008 | Chu | |
| 7,440,444 B2 | 10/2008 | Nishida et al. | |
| 7,486,971 B2 | 2/2009 | Awada et al. | |
| 7,519,168 B2 | 4/2009 | Suffern et al. | |
| 7,610,044 B2 * | 10/2009 | Sindoni ..................... 455/414.1 |
| 7,613,287 B1 | 11/2009 | Stifelman et al. | |

(Continued)

FOREIGN PATENT DOCUMENTS

WO    2011082092 A1    7/2011

OTHER PUBLICATIONS

PCT/US08/09358 International Search Report, dated Nov. 5, 2008.

(Continued)

*Primary Examiner* — Blane J Jackson
(74) *Attorney, Agent, or Firm* — Kenneth L. Sherman; Hemavathy Perumal; Sherman IP LLP (57) ABSTRACT

A system for creating, using, and disseminating audio/video clips on a mobile device and in other contexts is disclosed.

38 Claims, 10 Drawing Sheets

(56) References Cited

U.S. PATENT DOCUMENTS

| | | | |
|---|---|---|---|
| 7,904,061 B1* | 3/2011 | Zaffino et al. | 455/414.1 |
| 2006/0015649 A1* | 1/2006 | Zutaut et al. | 709/246 |
| 2006/0028951 A1 | 2/2006 | Tozun et al. | |
| 2006/0112811 A1 | 6/2006 | Padhi et al. | |
| 2006/0136556 A1 | 6/2006 | Stevens et al. | |
| 2006/0199575 A1 | 9/2006 | Moore et al. | |
| 2006/0259434 A1 | 11/2006 | Vilcauskas et al. | |
| 2007/0028264 A1 | 2/2007 | Lowe | |
| 2007/0112977 A1 | 5/2007 | Hornal et al. | |
| 2007/0124452 A1 | 5/2007 | Mohammed | |
| 2007/0127706 A1 | 6/2007 | Hightower et al. | |
| 2007/0129067 A1* | 6/2007 | Summer et al. | 455/414.1 |
| 2007/0189708 A1 | 8/2007 | Lerman et al. | |
| 2007/0264978 A1 | 11/2007 | Stoops | |
| 2007/0288596 A1 | 12/2007 | Sindoni | |
| 2007/0300269 A1* | 12/2007 | Roberts et al. | 725/88 |
| 2008/0052371 A1 | 2/2008 | Partovi et al. | |
| 2008/0120369 A1* | 5/2008 | Gustavsson | 709/204 |
| 2008/0167968 A1 | 7/2008 | Cue et al. | |
| 2008/0270913 A1 | 10/2008 | Singer et al. | |
| 2009/0003538 A1 | 1/2009 | Sharpe et al. | |
| 2009/0003577 A1 | 1/2009 | Chin et al. | |
| 2009/0029685 A1* | 1/2009 | Willis | 455/414.1 |
| 2009/0041208 A1 | 2/2009 | Tsui et al. | |
| 2009/0042622 A1 | 2/2009 | Tsui et al. | |
| 2010/0125795 A1 | 5/2010 | Yu et al. | |
| 2010/0322392 A1 | 12/2010 | Walker et al. | |

OTHER PUBLICATIONS

PCT/US08/09358 Written Opinion , dated Nov. 5, 2008.
PCT/US08/009358 International Preliminary Report on Patentability mailed Feb. 18, 2010, eight pages.
U.S. Non-Final Office Action for U.S. Appl. No. 12/649,010 (357314-991230) mailed Oct. 3, 2013.
PCT International Search Report, PCT/US2010/061937, dated Feb. 28, 2011.
PCT Written Opinion, PCT/US2010/061937, dated Feb. 28, 2011.
U.S. Final Office Action for U.S. Appl. No. 12/649,010 mailed Sep. 8, 2014.
International Search Report and Written Opinion dated Feb. 28, 2011 for International Application No. PCT/US2010/061937 from United States Patent and Trademark Office, filed Dec. 22, 2010, pp. 1-7, United States.
International Preliminary Report on Patentability dated Jul. 4, 2012 for International Application No. PCT/US2010/061937 from United States Patent and Trademark Office, filed Dec. 22, 2010, pp. 1-6, United States.
Myspace.Com, "About Us", myspace.com, Oct. 8, 2003, p. 1, United States.
Tabak, A.J., "Hundreds Register for New Facebook Website", The Harvard Crimson, Feb. 9, 2004, pp. 1-3, United States, http://www.thecrimson.com/article/2004/2/9/hundreds-register-for-new-facebook-website (last visited Sep. 20, 2012).
U.S. Non-Final Office Action for U.S. Appl. No. 12/649,010 (357314-991230) mailed Jun. 21, 2012.
U.S. Final Office Action for U.S. Appl. No. 12/649,010 (357314-991230) mailed Jan. 16, 2013.
U.S. Non-Final Office Action for U.S. Appl. No. 12/167,162 (357314-991182) mailed Mar. 29, 2011.
U.S. Non-Final Office Action for U.S. Appl. No. 12/167,162 (357314-991182) mailed Oct. 14, 2011.
U.S. Notice of Allowance for U.S. Appl. No. 12/167,162 (357314-991182) mailed Jan. 1, 2012.

* cited by examiner

METHOD AND APPARATUS FOR CREATING, USING, AND DISSEMINATING CUSTOMIZED AUDIO/VIDEO CLIPS

PRIORITY CLAIM

This application claims priority under 35 USC 119(e) and 120 to U.S. Provisional Patent Application Ser. No. 60/954,268 filed on Aug. 6, 2007, which is incorporated by reference herein.

FIELD OF THE INVENTION

The invention relates generally to a method and apparatus for creating, using, and disseminating customized audio and/or video ("audio/video") clips.

BACKGROUND OF THE INVENTION

The proliferation of cellular phones and other mobile devices with phone capabilities has led to a ring tone business where companies compete to provide ring tones. Currently, the ring tone market is as much as $1 billion dollars per year. There are several known techniques for getting a new ring tone and/or for creating a new ring tone. A ring tone sometimes is referred to as a ringer.

For a user to obtain a new ring tone, the user can often browse on a computer (not the mobile device) to a particular website from which the user can search for and select a ring tone. Once the user has selected the ring tone (often with the ability to listen to the ring tone before purchase), the user pays for the new ring tone and enters the phone number of the user's mobile device. Once the purchase is complete, the website sends a well known SMS message to the mobile device wherein the SMS message contains an embedded link to the selected ring tone on a wireless access protocol (WAP) site from which the ring tone may be downloaded. Thus, once the mobile device receives the SMS message, the user can click on the embedded link and then download the ring tone to the mobile device. One significant limitation with this approach is that it is often not possible to listen to the actual ring tone on the mobile device itself until after the ring tone is already purchased. In addition, the process of purchasing the new ring tone is a slow, multistep process which may cause a user to abandon the effort to download and then pay for the ringer.

For a user to create a new ring tone, the user may own a particular song/track and then use song editing equipment/software on a personal computer or the like to select a portion of the song/track and then generate the ring tone. There are also commercial services that provide a website that allows the user to create his/her own ring tone based on a track/song owned by the user or purchased by the user during the generation of the new ring tone. Once the ring tone is generated (either on the computer or at the website), the user must then download the new ring tone to the mobile device as before which complicates the process unnecessarily.

Mobile device users often choose their ring tone to reflect their musical taste or personality. It identifies the individual to such a degree that the user's colleagues eventually will know that it is the user's mobile device (as opposed to someone else's mobile device) that is ringing based solely on hearing the user's ring tone. Because a ring tone can become a personal identifier for the user, it would be desirable for the user to be able to use that ring tone as a personal identifier in contexts other than the ringing of the user's mobile device. A ring tone can more generally be considered to be an audio/video clip, where the audio/video clip can include audio content (as in a traditional ring tone), video contact, or both.

The prior art also includes social networking websites available on the Internet, such as Facebook® (www.facebook.com) and myspace® (www.myspace.com).

SUMMARY OF THE INVENTION

One aspect of the invention is to provide a method and apparatus by which a user of a social networking website can share a customized audio/video clip with other users of the social networking website. This would allow the other users to hear/see the user's customized audio/video clip, and the website optionally can provide those users with the option to build their own customized audio/video clips, to purchase the user's audio/video clip, or to purchase the entire content piece (e.g., song) from which the audio/video clip was taken.

Another aspect of the invention is to use a customized audio/video clip as a personal identifier in other contexts. For example, when a first user sends an email or Instant Messenger message to a second user, the first user can send his or her customized audio/video clip along with that email or message, such that the second user hears/sees the first user's customized audio/clip when the email or message arrives. Much like a ring tone on a mobile device, the use of a customized audio/video clip in this context will alert the second user that the first user is sending a communication to him or her.

Another aspect of the invention is to provide a single location for a user to modify or change his or her customized audio/video clip and to automatically propagate the new clip to a plurality of locations on the Internet or other network where a different clip previously was used, such as on a facebook® user page or in the user's email server.

Another aspect of the invention is to enable a receiving mobile device to identify the calling device (such as through the prior art "caller ID" feature), and to then find and obtain data associated with that device or the caller who is operating the device from a social networking website or other data repository. The data can include a customized ringtone that the caller previously created, a photo of the caller, or other information or data regarding the caller.

Thus, it is desirable to provide an apparatus and method that permits a user to create, use, and disseminate a ringtone on a mobile device, and more generally, to create, use, and disseminate a customized audio/video clip within a social networking website and in other contexts.

DETAILED DESCRIPTION OF THE EMBODIMENTS

One embodiment is particularly suitable for generating an audio ringer for a mobile phone on the mobile phone itself, and it is in that context that a system and method are described for illustration purposes. However, the system and method may also be used to generate a ring tone for other mobile computing devices with phone capabilities and may be used to generate different ring tones, such as video ring tones or audiovisual ring tones.

Figure 1:
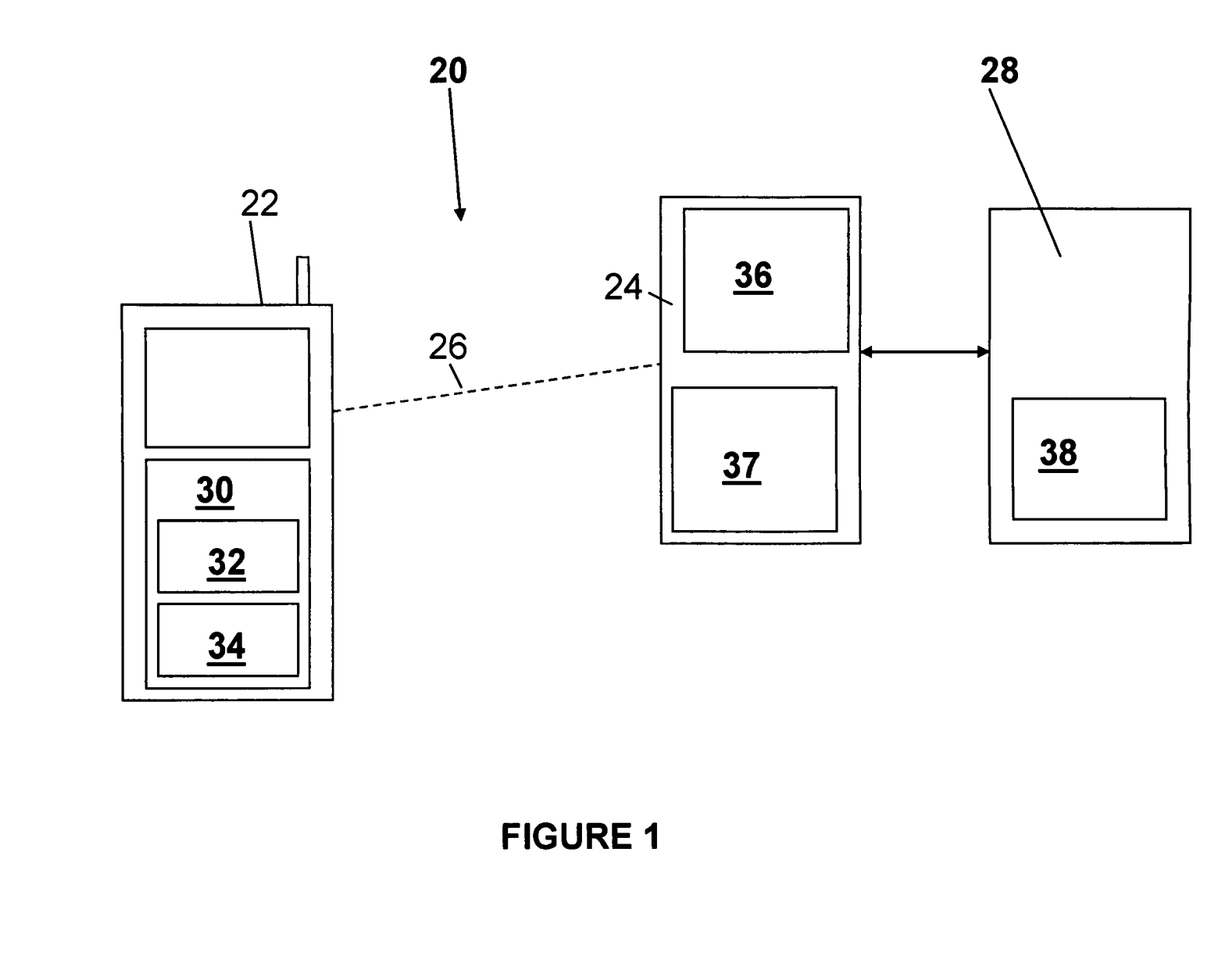
FIG. 1 is a diagram of a ringer generation system.

FIG. 1 is a diagram of a ringer generation system 20. The system may include a mobile computing device 22, such as mobile phone in the illustrated example, a generator unit 24 that can communicate and exchange data with the mobile computing device over a network 26, such as a cellular phone network in the illustrated example, and the generator unit 24 is in turn capable of communicating with and exchanging data with a computing device 28. The mobile computing device may be a processing unit based device with phone capabilities and the typical components of a device, such as a PDA, mobile phone, wireless email device (such as the Blackberry), or other handheld device that has wireless connectivity to be able to communicate with the network 26. The computing device 28 may be a processing unit based device, such as a server computer, personal computer and the like.

In the ringer generation system, the mobile computing device 22 may further include a memory 30 that may further contain a generator module 32 and a store 34 wherein the generator module 32, may be implemented, for example, with a plurality of lines of computer code that are executed by the processing unit of the mobile computing device, and may be used to generate a new ringer on the mobile computing device. In one embodiment, the generator module may be a piece of code comprising a plurality of lines of JAVA language computer code (a JAVA language application) that are executed by a Java engine that is already stored on the mobile computing device. The store 34 may be, for example, a software based database that allows the user of the mobile computing device to store one or more pieces of content that may be played by the mobile computing device such as music, video, etc. as well as the ringers that are generated by the generator module.

The generator unit 24 may be, for example, a server computer, that may further comprise a generator 36 that performs some of the functions and operations of the ringer generation method described in FIGS. 2-3 as described below in more detail. For example, the generator 36 may determine if a full track of the ringer content is available either in a content store 37 in the generator unit 24 and/or in a content store 38 associated with the computing device 28. The generator unit may also include the ability to communicate with the mobile computing device and deliver data to the mobile computing device as described in more detail below. Using the above system, the user of the mobile computing device optionally is able to generate a new ringer directly on the mobile computing device, adjust the characteristics of the new ringer, preview the ringer before purchase, and then download the new ringer.

In one illustrative embodiment, the generator module allows users to make personalized ringers for their mobile computing devices directly from their mobile computing devices. The generator module allows the user to use their own music track (in the content store 38 in the computing device 28) or one from a catalog of songs (in the generator unit store 37) to generate the ringer. The user may be given a visual representation of the track and the user then chooses the start and end points of the ringer. The user then receives a ringer that they can use throughout their mobile computing device.

Figure 2:
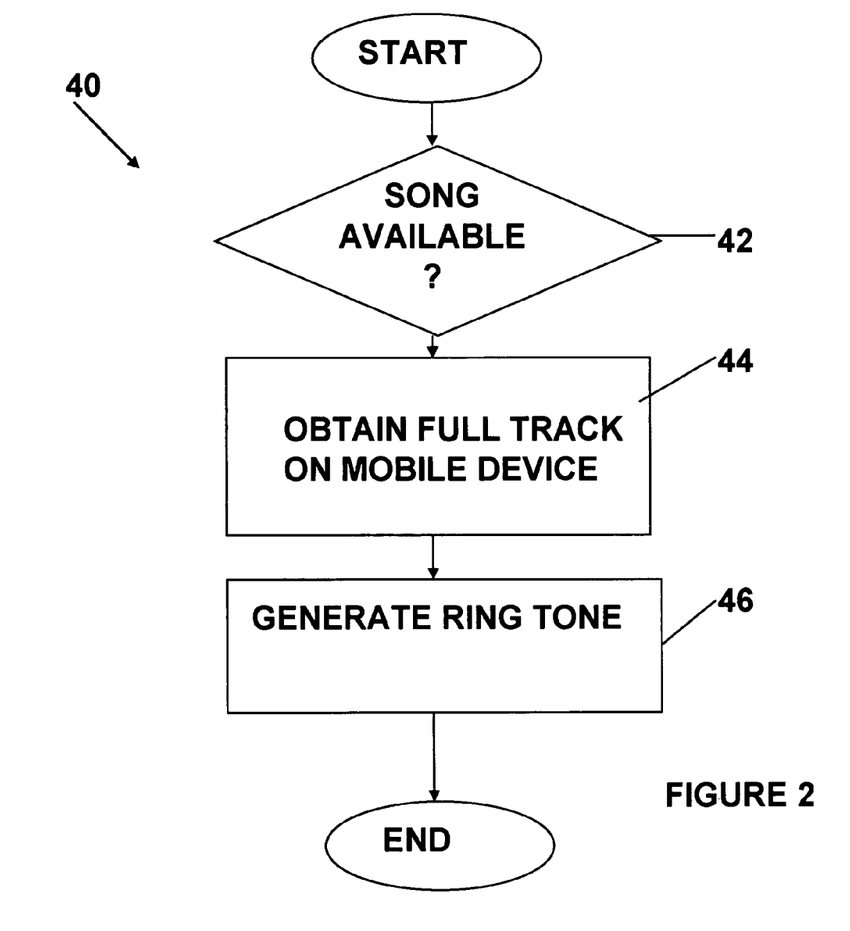
FIGS. 2 and 3 are diagrams of a method for ringer generation.
Figure 3:
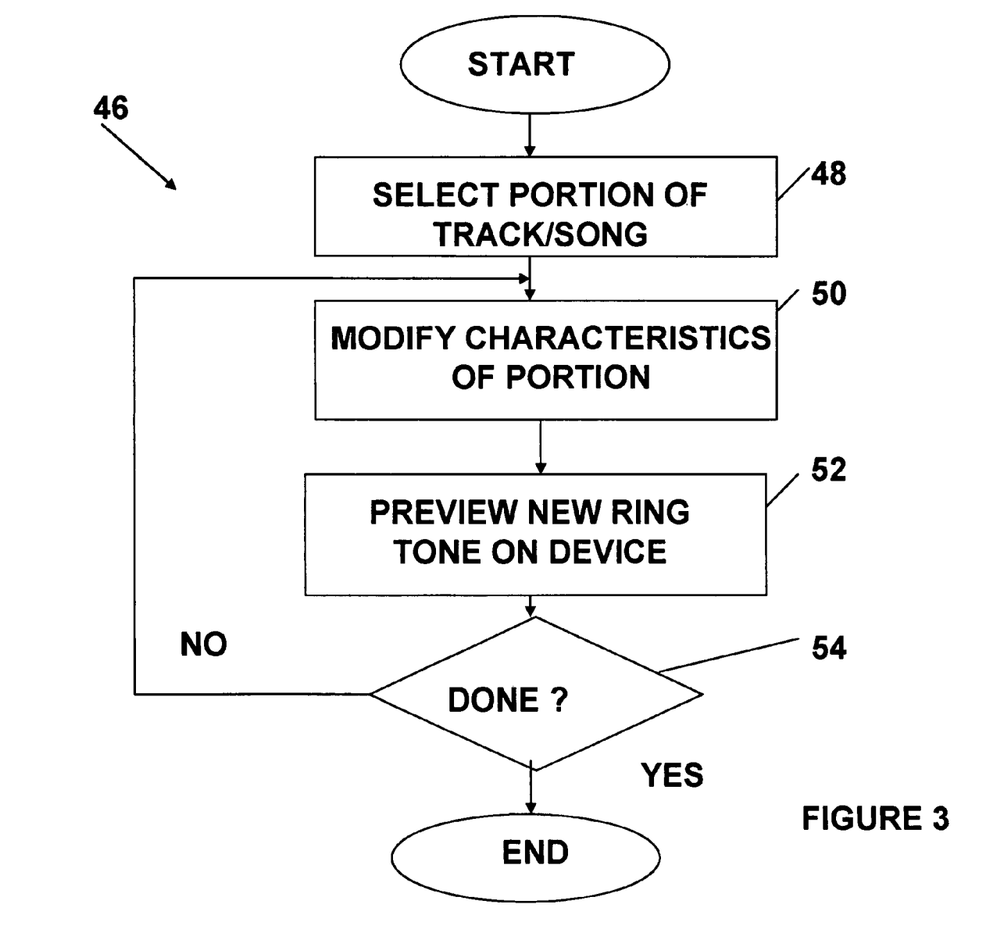

FIGS. 2 and 3 are diagrams of a method 40 for ringer generation. The method may be carried out by the generator module 32 and the generator unit 24 shown in FIG. 1. In the method, the user of the mobile computing device may request to make a new ringer based on a particular piece of content, such as a particular track of music. This request is communicated to the generator unit that determines if the particular track is available (42) either in the store of the generator unit and/or in the computing device store. Since the upload speed of the mobile computing device is typically slow so that it is quite time consuming to upload an entire song to the generator unit (to determine if the track is available) for processing, the mobile computing device may instead generate a digital signature for the track. The digital signature may be used by the generator unit to search the content store to determine if there is a match for the requested track in the content store in either the generator unit or the computing device. This allows the service to ensure that the end user had the digital rights (DRM) or a legitimate copy of the track/song so that the system and method can enable the ringer editing capability. This service is not possible under current rights agreements without a copy of the full track. In one example, the user may browse a user interface to select a particular track/song and then locate that song/track.

If the particular track is not available, the method is completed. On the other hand, if the track is available, then the full track is obtained by the mobile computing device (44) wherein the full track is downloaded from the generator unit since the full track on the mobile computing device (if available) will be of lower resolution and poorer quality. Once the full track is available at the mobile computing device, the generator module in the mobile computing device may be used to generate a ringer (46).

During the ringer generation, the generator module may allow the user to select a portion of the track (48) and then modify certain characteristics of the track (50). The generator module may also preview the ringer (52) on the mobile computing device. If the preview is not acceptable (54) (which is a preview of the actual ringer), the method loops back to any prior process so that the user can revise and redo the ringer. If the ringer is acceptable, then the method is completed and the ringer is purchased by the user and the user can use the ringer. In addition, a user may move between any process in FIG. 3 and any other process in FIG. 3.

The system and method may be used to generate an audio ringer (described above). It may also be used for video ringers, a ringer linked with an image or an audiovisual ringer. The song/track used to generate the ringer may be the songs/tracks already stored in the mobile computing device, a catalog of songs/tracks maintained by the generator system (so the user can purchase the full track and then create the ringer) or songs/tracks located on the computing device owned by the user.

Figure 4A:
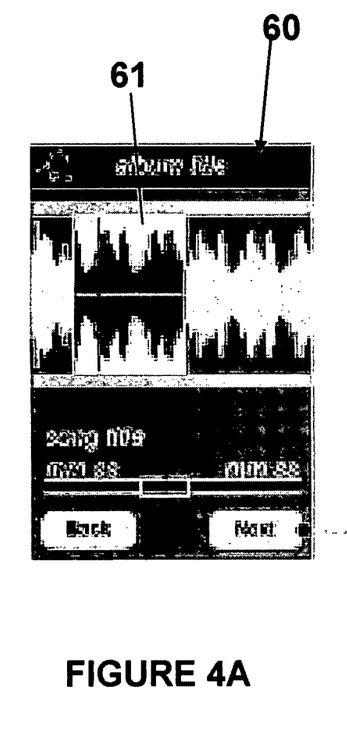
FIGS. 4A, 4B and 4C illustrate examples of a user interface for an implementation of the ringer generation system implemented on a mobile device.
Figure 4B:
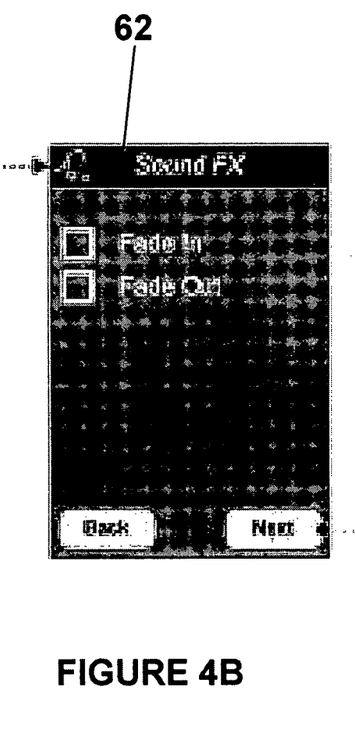
Figure 4C:
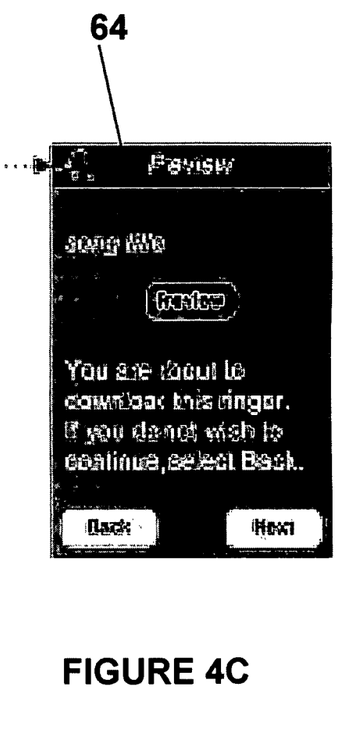

FIGS. 4A, 4B and 4C illustrate examples of a user interface for an implementation of the ringer generation system implemented on a mobile device. Most mobile computing devices have an input device, such as a four way keypad that may be used as the primary interface device for the ringer generation method that allow the user to create and/or modify a ringer. The input device permits the user to edit, zoom, playback, and download the track and/or ringer. Optionally, when doing zooming/editing of the track profile, the digital data representing the track is downloaded to the mobile computing device from the generator unit (rather than having the processing unit of the mobile computing device generate the visual representation of the track) so that the zooming and/or editing can be done without using the limited CPU of the handset.

As shown in FIG. 4A, a user interface 60 allows the user, using the 4 way input device to select the portion of the track for use as the ringer. A window 61 is superimposed over the profile of the track that shows the portion of the track currently selected by the user. The user interface may also magnify the left edge of the track profile when the user adjusts the starting point of the ringer as shown by the window 61. The user interface may also magnify the right edge of the track profile when the user adjusts the length of the ringer as shown by the window 61 and then play a few seconds at the end of the ringer so that user can determine if the end is the appropriate location.

FIG. 4B shows a user interface 62 that allows the user to adjust certain other characteristics of the ringer such as a fade in or a fade out or various other characteristics of the ringer. FIG. 4C shows a user interface 64 that allows the user to preview the actual ringer on the mobile computing device before purchasing the ringer. In typical systems using WAP pages, it is not possible to permit a preview since the download from the WAP page would allow the user to preview and then keep the ringer without payment. In the ringer generator system, the ringer is streamed and is not permanently stored (downloaded into the memory and used by the JAVA code) so that it can be previewed without losing the ability to charge for the ringer. As shown in the series of user interfaces, the generator system permits the ringer generation and download to occur from a single series of user interfaces so that it is easier for the user to generate, preview and then download the ringer.

In an alternative embodiment, after viewing the representation of the fulltrack and selecting the start and end points of the track to be played when the phone rings as shown in FIG. 4A, the user can store the location of the start and end points for the ringer on the mobile computing device. Then, the mobile device can be modified to use the start and endpoints to playback only the portion of the fulltrack specified without the need to make another copy of the full track on the mobile computing device. In this alternative embodiment, if the user already owns the full track for the song being used to make the ringer and the full track is stored on the mobile computing device, the ringer generator does not need to make another copy of the full track of the song in order to playback the ringer. In this alternative embodiment, the ringer is played by playing the portion of the full track (identified by the stored start and end points of the ringer) whether the song uses DRM or not. Thus, the user does not need to pay for the mechanical and music rights to another copy of the full track in order to specify a new ringer.

Figure 5:
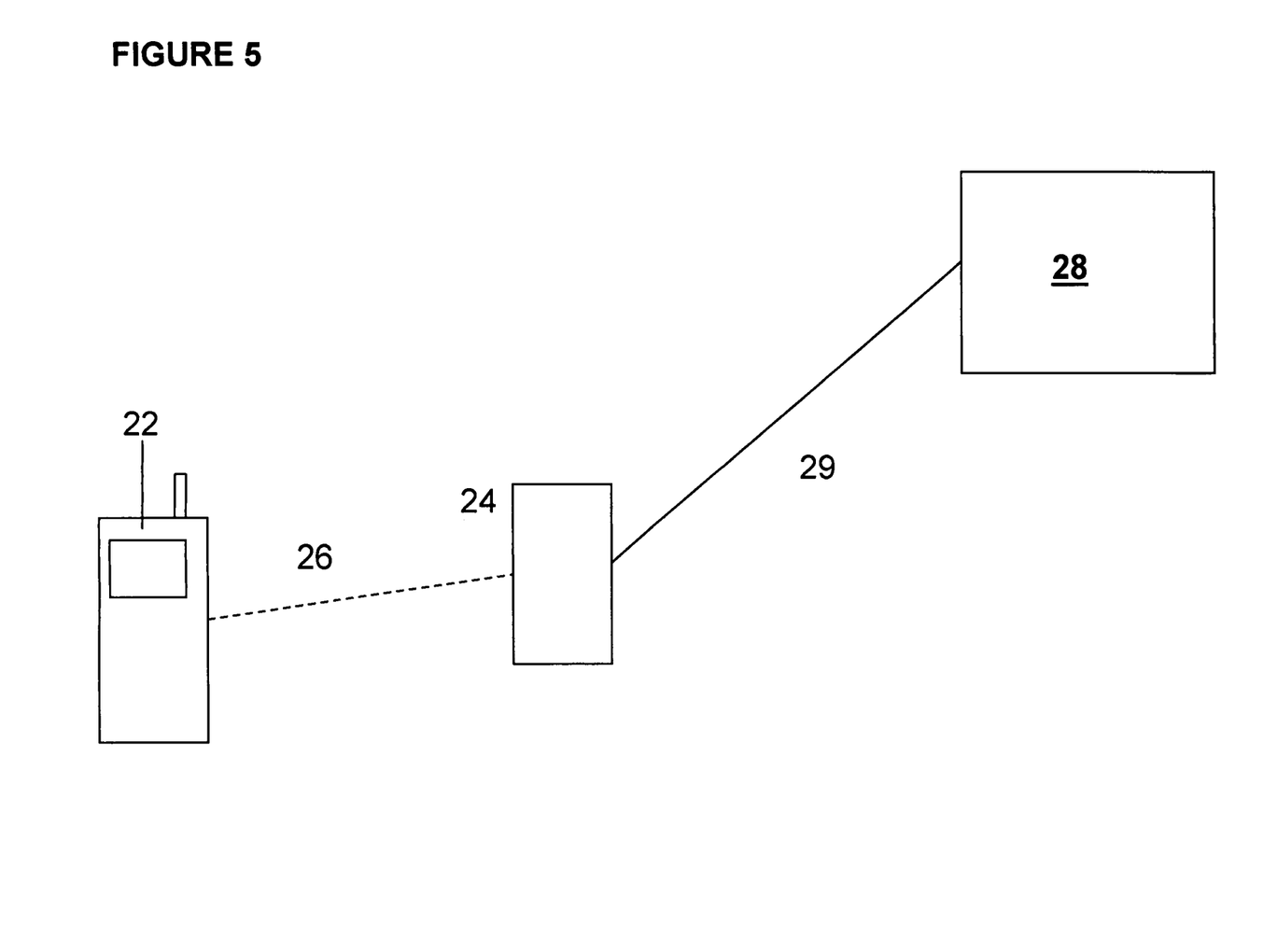
FIG. 5 illustrates an example of a content system that may include the ringer generation system.

FIG. 5 illustrates an example of a content system that may include the ringer generation system. As in the prior art, a user stores digital content (such as music, video, etc.) on computer 28. However, in this embodiment, the user downloads the digital data from computer 28 to mobile computing device 22 in a wireless fashion over a wireless communication path. Mobile computing device 22 may be a PDA, mobile phone, wireless email device (such as the Blackberry), or other handheld device that has wireless connectivity to be able to communicate with the computer 28 and download digital content from the computer 28. Computer 28 communicates with a device 24, such as a server computer, over network 29. Network 29 can be any type of network, such as the Internet, and can be hardwired, wireless, or some combination of the two. Computer 28 runs a software application that allows a user to catalog and organize the digital content of the user. The device 24 can be accessible over the Internet (such as through a URL address). The device 24 is shown in FIG. 5 as a single device. However, it is to be understood that the device 24 can instead comprise multiple devices, such as multiple servers.

Mobile computing device 22 connects to device 24 over a wireless network 26. Wireless network 26 can be a cellular telephone network, a WiFi network (such as an 802.11 network), a wireless data network (such as EV-DO or EDGE), or any other wireless network. It is to be understood that wireless network 26 need not connect directly to server device 24, but instead can connect through an indirect means such as by the Internet or through another network. The ringer generator system shown in FIG. 1 can be integrated with this content system.

Figure 6:
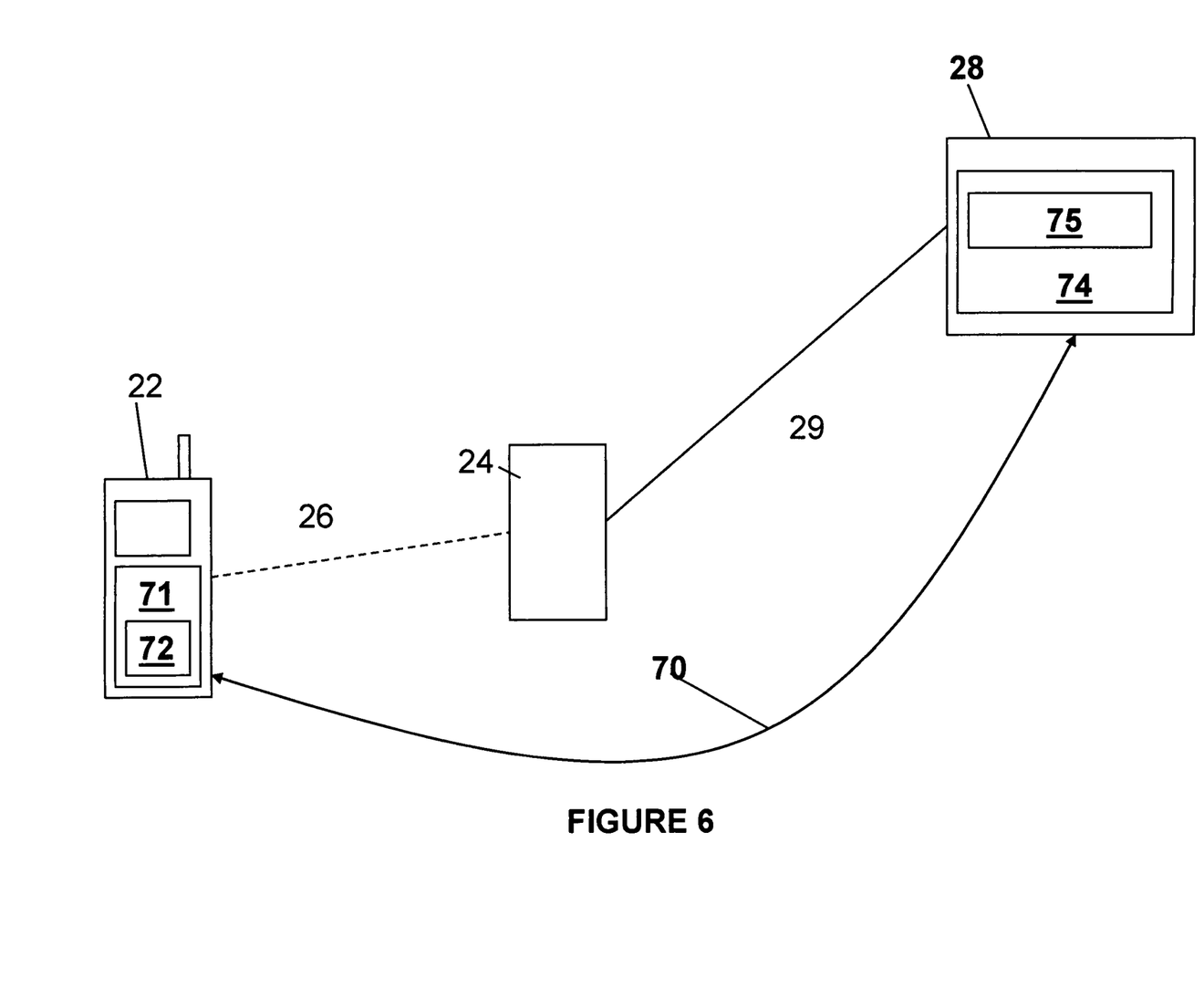
FIG. 6 illustrates an example of another content system that may include the ringer generation system.

FIG. 6 illustrates an example of another content system that may include the ringer generation system wherein the content system allows a mobile computing device 22 to share content among a plurality of computing devices wherein the mobile handset has the content store 71 and playlists 72. As shown, the system permits the mobile computing device 22 to synchronize its content with a plurality of computing devices $28_1$, $28_2$, ..., $28_n$ and each computing device maintains a content store 74 and at least one playlist 75 for the content on the mobile handset. For example, in a family in which the different family members each have their own computing device, the mobile handset of a particular family member can be synchronized to the multiple computing devices so that the content purchased by each member of the family can be shared. Similarly, the system permits multiple mobile handsets to synchronize their content with a single computing device (such as might be the case of a family) or multiple mobile handsets can synchronize their content with multiple computing devices. Thus, the system permits the computing devices to effectively share content between the computing devices.

In another embodiment, a user can share a customized audio/video clip (such as a ring tone) with other users over a social networking website such as facebook® or myspace®. Social networking websites have become popular in recent years and allow users to register with the website and form social networks of friends and colleagues. Users in a social network can then interact online by exchanging messages, photos, and other forms of information. Each user typically is given a personal page within the social networking website where the user can post information about himself or herself, such as the names and photos of the user's friends who are members of the social networking website, a description of the user's background, the user's opinions on a variety of issues and media content, and other information.

Figure 7:
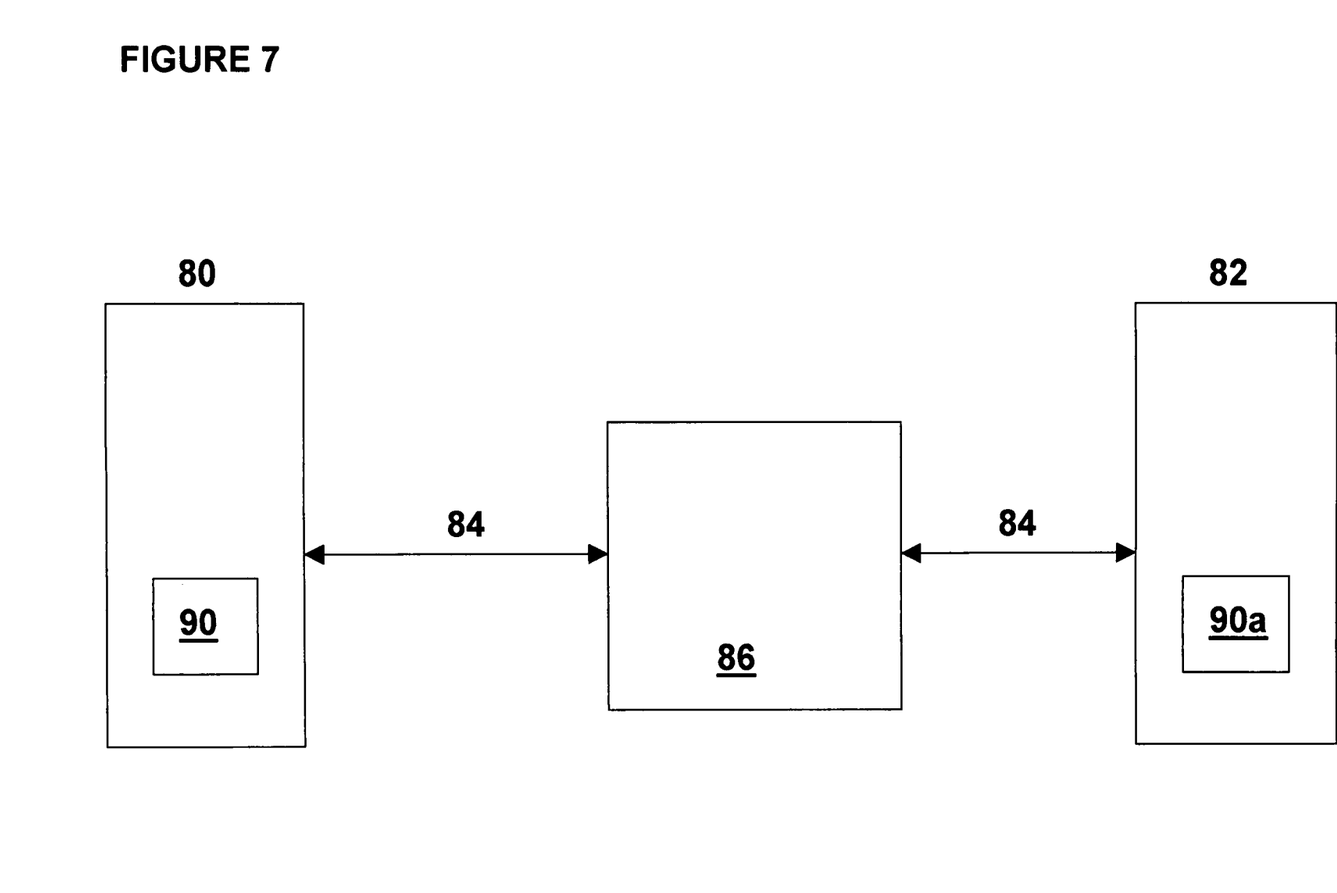
FIG. 7 is a diagram of two users connected over a social network.

With reference now to FIG. 7, User A operates computing device 80. User A creates an audio/video clip 90 on computing device 80 using the methods illustrated in FIGS. 2-4 or by using a different method, such as the prior art method of creating ring tones on computers by accessing a website over a desktop or notebook computer. Audio/video clip 90 can be an MP3 file, other MPEG file, JPEG file, or other type of file that can store audio and/or video data. User B operates computing device 82. Computing devices 80 and 82 can be mobile devices, notebooks, desktops, servers, or other computing devices. Users A and B connect to server 86 over a network 84 such as the Internet. Network 84 can comprise a plurality of separate networks using a variety of communication mediums, such as hardwired connections, wireless connections, etc. In this example, server 86 operates a website, such as social networking website or another website that permits users to exchange content.

User A then shares audio/video clip 90 with User B through server 86. User A can do this, for example, by posting audio/video clip 90 on his personal page on a social networking website hosted on server 86, such that User B and other users can hear/see the clip when they visit User A's personal page, either automatically, by clicking on an icon (such as a play button), or by some other method. User A also can send audio/video clip 90 to User B through the communication mechanism of the social networking website, such as by sending a message, email, "gift," "poke," or other methods facebook® currently offers the ability for one user to send another user a "gift," such as a graphical icon of a flower or box of candy, or to "poke" (using a facebook® application called "superpoke" offered by slide.com or other applications) by sending a short graphical animation, such as a depiction of the sender throwing a sheep at the recipient. Under this embodiment, User A would be enabled to transmit his or her audio/video clip 90 to User B, such as by sending a "gift" or "poking" User B. User B can then store audio/video clip 90 on his or her computing device as audio/video clip 90*a*. In this manner, User A is able to share his or her audio/video clip 90 with User B through a website operated by server 86, such as a social networking website or another website that enables users to exchange content. Audio/video clip 90*a* can be identical to audio/video clip 90, or it can be a modified version of it (such as a shorter version, a compressed version, a lower fidelity or lower resolution version, etc.).

If computing device 82 is a mobile device (such as a cellular handset), there are a number of different mechanisms by which it can receive audio/video clip 90 from computing device 80. For example, server 86 can send a text message using SMS to computing device 82 (e.g., "You have received an audio clip from User A. Click this link to access."). User B can then access audio/video clip 90 by clicking the link, which typically would launch a website browser that would enable User B to access audio/video clip 90. In the alternative, server 86 can send a message using MMS to computing device 82 (e.g., "You have received an audio clip from User A. Click here to listen.") MMS enables the sender to embed the actual audio or video content into the MMS message, so that the message received by computing device 82 actually contains the audio/video clip 90 within it, such that computing device 82 would not need to obtain the clip from elsewhere and could begin playing the clip immediately upon being instructed by the user to do so. In the alternative, server 86 can simply send information to User B through normal website mechanisms (such as by sending a message to User B's account within a social networking website), and User B can access audio/video clip 90 on the website using a browser on computing device 82.

If computing device 82 is a traditional desktop or notebook computer, then it can receive audio/video clip 90 via a website, email system, instant messaging system, or other communication mechanism.

Figure 8:
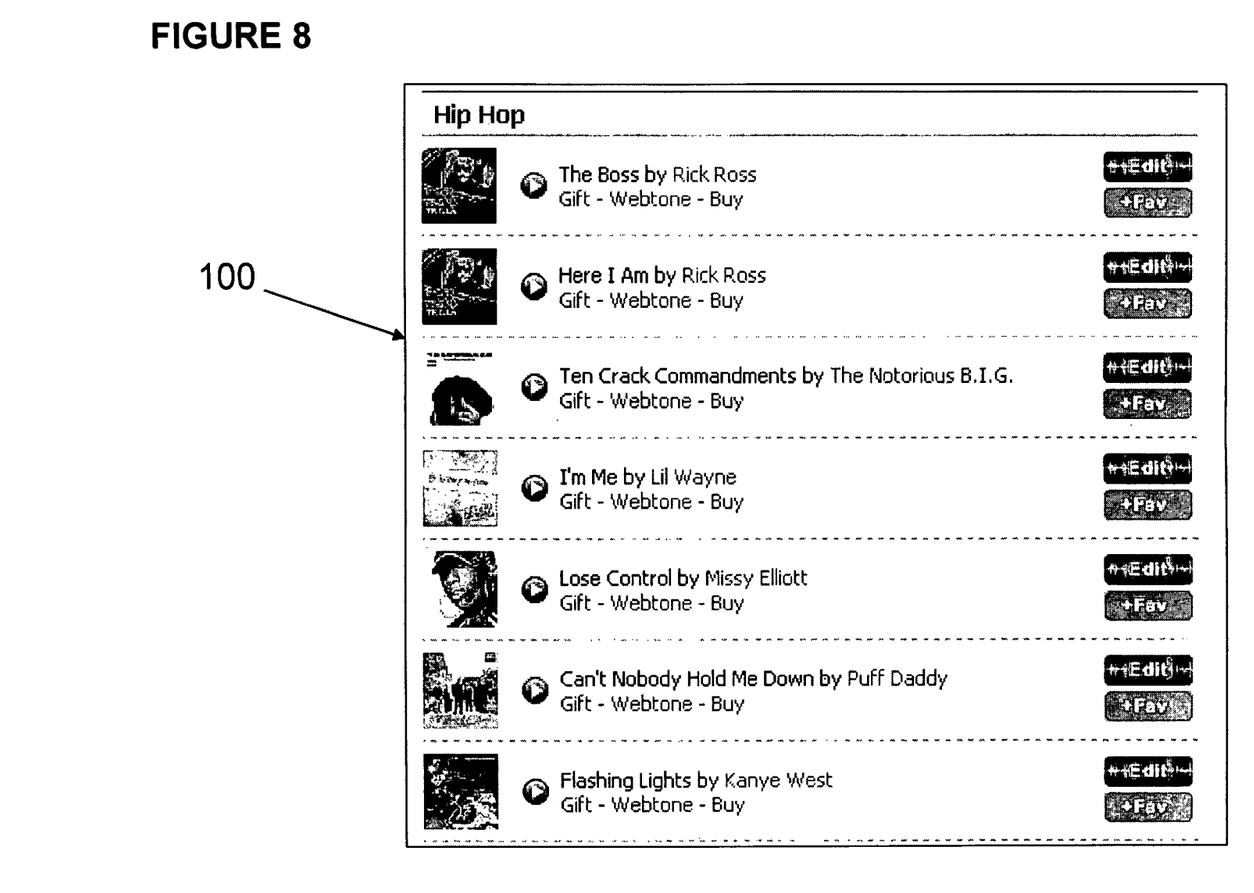
FIG. 8 illustrates an example of a user interface for an implementation of the social network activities relating to audio/video clips.

Optionally, User B is provided with the ability to purchase audio/video clip 90 to use as a ring tone on his or her own mobile device, if User A has not already purchased that right for User B. This can be facilitated by a button, link, or other mechanism on User A's personal page on the social networking website that allows User B and other users to purchase audio/video clip 90 to use as a ring tone on his or her own mobile device, or it can be facilitated by a button, link, or other mechanism in the message, email, "gift" or other communication method by which User A sent the audio/video clip to User B. FIG. 8 shows an exemplary user interface 100 that provides a user with the options discussed above, namely, "Gift," "Buy," and "Edit." In another aspect of the embodiment, a user can be provided the option of buying the entire piece of content (e.g., an entire song) from which the audio/video clip was taken.

In another embodiment, User A creates the audio/video clip 90 from an application within the social network website. The application can have a similar user interface as that shown in FIGS. 4A-4C. This application can be created using HTML or other code that is embedded within the social networking website.

In another embodiment, an audio/video clip created by a user is disseminated to a plurality of destinations that in turn will use the audio/video clip in an application or manner associated with a user. With respect to FIG. 9, User A creates audio/video clip 112 on computing device 110, using one of the mechanisms described previously. Computing device 110 stores audio/video clip 112 in its memory or storage device. User A's computing device 110 connects to server 114 over network 116. Optionally, User A can create audio/video clip 112 on server 114 instead of on computing device 110, or User A can do so with computing device 110 in conjunction with computing device 110. Server 114 stores audio/video clip 112 or a modified version in its memory or storage device as audio/video clip 112*a*. Server 114 in turn connects to server 118 and server 120 over network 116. Network 116 can be the Internet or any combination of networks.

Figure 9:
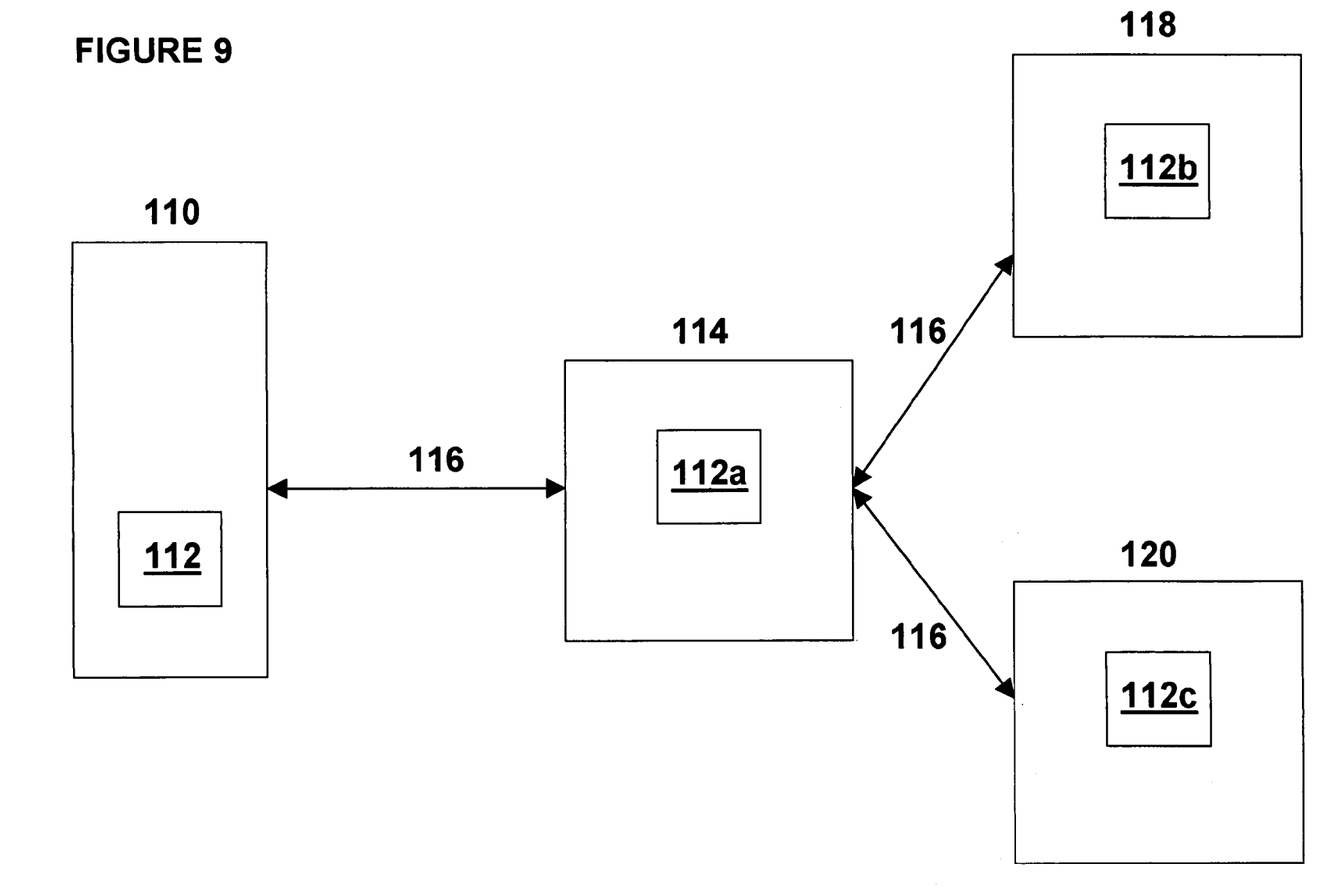
FIG. 9 is a diagram of a system that enables a user to automatically propagate his or her customized audio/video clip to a plurality of applications.

In this embodiment, when User A creates audio/video clip 112, computing device 110 provides that clip to server 114, which stores it or a modified version as audio/video clip 112*a*. Server 114 then automatically provides that content to servers 118 and 120, which are servers that store content or websites previously accessed or designated by User A. For example, server 114 might operate a website that facilitates the creation of audio/video clips for users, and servers 118 and 120 might operate a social networking website, email service, instant message service, electronic bulletin board, or other service. Servers 118 and 120 then receive audio/video clip 112*a* or a modified version from server 114 and then each stores it in its memory or storage device as audio video clips 112*b* and 112*c*, respectively. Audio/video clips 112*a*, 112*b*, and 112*c* can be identical to audio/video clip 112, or any or all of them can be modified versions of audio/video clip 112 (such as a shorter version, a compressed version, a lower fidelity or lower resolution version, etc.).

Server 114 performs the step of automatically providing audio/video clip 112*a* as a result of a software application that is running on server 114 that has previously been configured by or on behalf of User A to automatically provide audio/video clips to servers 118 and 120. For example, User A can instruct server 114 through the software application to automatically send the audio/video clip to servers 118 and 120 whenever User A sends a modified audio/video clip to server 114. Computing device 110 can provide the audio/video clip 112 to server 114 using an API or other interface mechanism. Similarly, server 114 can provide the audio/video clip 112*a* to servers 118 and 120 using an API or other interface mechanism.

Using this embodiment, User A is able to have his or her personal audio/video clip automatically updated on servers 118 and 120. This audio/video clip can serve as a personal identifier for User A. For example, if server 118 operates an instant messaging service (such as one currently offered by Yahoo!®, available at www.yahoo.com), then when User A sends an instant message to User B, User B can be prompted with a text message indicating that User A is sending an instant message to User B and/or User B can be prompted with audio/video clip 112a.

Figure 10:
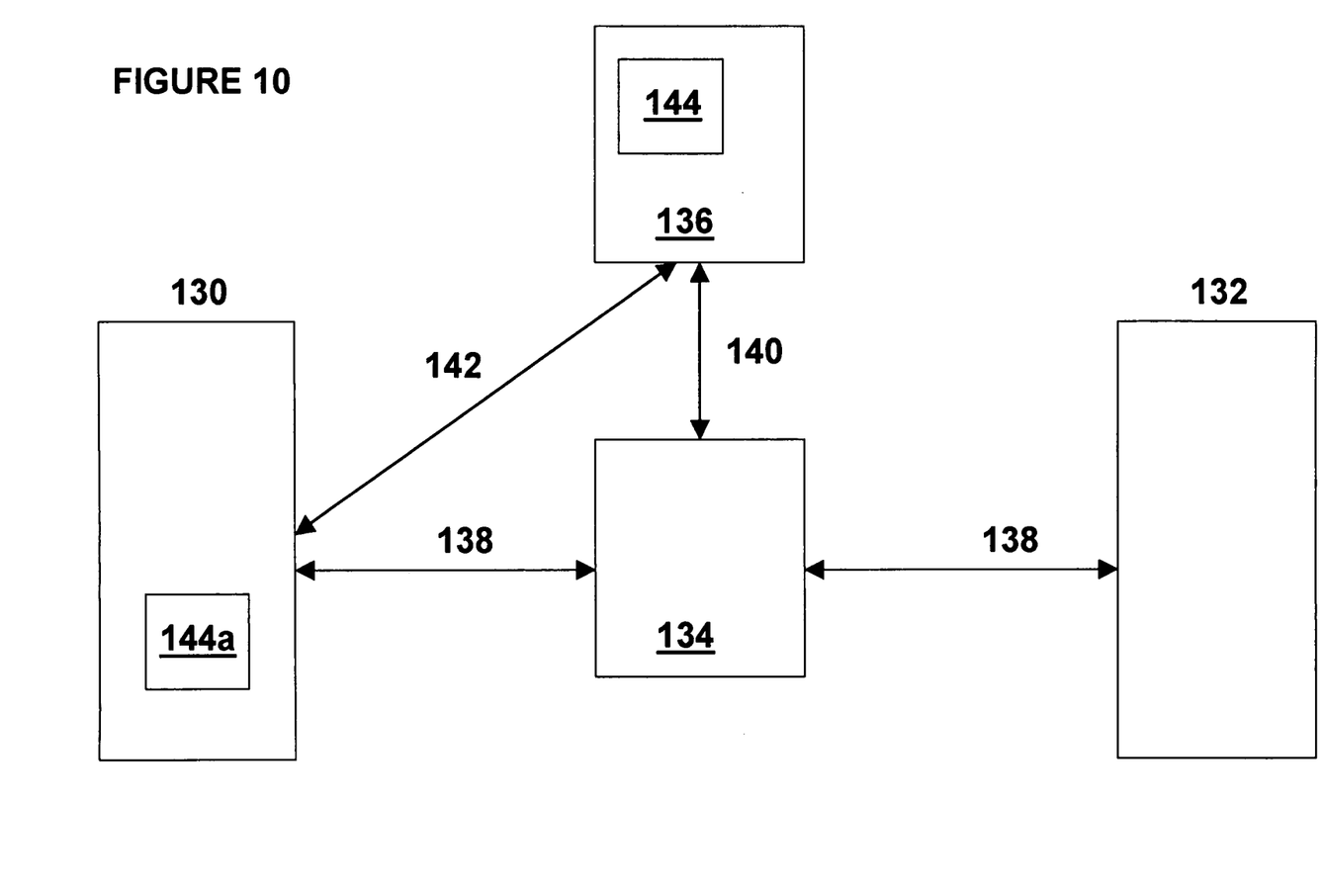
FIG. 10 is a diagram of a system that enables a computing device to obtain data concerning a user from another computing device.

With reference now to FIG. 10, User A operates computing device 130. User B operates computing device 132. Computing device 136 is a device that stores data that is related to User B. For example, computing device 136 can be a server that hosts a social networking website on which User B creates a user page containing data related to User B, such as a customized audio/video clip, a photo of User B, information regarding User B (such as his favorite movie, favorite book, favorite greeting, favorite quote, etc.) User B inputs data 144 into computing device 136. For example, User B can create an audio/video clip on computing device 132 using the methods illustrated in FIGS. 2-4 or by using a different method, such as the prior art method of creating ring tones on computers by accessing a website over a desktop or notebook computer. Computing devices 130, 132, and 136 can be mobile devices, notebooks, desktops, servers, or other computing devices. Computing devices 130 and 132 are enabled to communicate with one another by device 134. Device 134 can be a computing device or any device that enables network, voice, cellular, or data communication. Computing devices 130 and 132 connect to device 134 over a network or link 138. Device 134 can communicate with computing device 136 over network or link 140. Computing device 130 can communicate with computing device 136 over network or link 142. Network or link 138, 140, and 142 each can comprise a plurality of separate networks or links using a variety of communication mediums, such as hardwired connections, wireless connections, etc. Network or link 138, 140, and 142 each can be part of the same network (such as the Internet), or they can be separate networks or links, or they can overlap.

In the situation where computing devices 130 and 132 are mobile handsets, User B uses computing device 132 to call User A on computing device 130. Device 134 recognizes computing device 132 as the initiating device of the call (by using the prior art "caller ID" feature" or other method). Device 134 then accesses computing device 136 and searches for any data 144 previously stored there by User B and/or stored there in a manner that associates the data with computing device 132. If device 134 finds such data, it downloads it from computing device 136 and sends all or part of it to computing device 130. Computing device 130 stores data 144 as data 144a (which is either identical to data 144 or is a revised version of data 144 or a portion thereof) in its memory or storage device. Computing device 130 then alerts User A that User B and/or computing device 132 is calling by playing and/or displaying data 144a. For example, if data 144a includes a ringtone, computing device 130 can play the ringtone. If data 144a includes a photo, computing device 130 can display the photo.

In the alternative, device 134 can send identifying information (such as caller ID information) to computing device 130, and computing device 130 can communicate directly with computing device 136 to search for and obtain data 144. Once it obtains data 144, computing device 130 stores it as data 144a, and it can operate in the same manner described previously.

The embodiment shown in FIG. 10 and described above has the benefit of enabling User A to hear a ringtone customized by User B and to see data that is specific to User B, such as his or her photo. User B can modify the ringtone or data without involving User A or computing device 130, yet User A will still be able to hear/see the modified data when User B calls User A. This can be an interesting way for people to share clips of their favorite music with one another, or to share new photos. For example, if User B is traveling around the world, each time User B calls User A, he can send a new photo that he previously uploaded to computing device 136 to show User A a new aspect of User B's travels.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for disseminating a clip over a social network, the method comprising:
receiving, at said social network, a clip generated using a first computing device, wherein said clip is less than a full piece of content;
associating, at said social network, said clip with said first computing device; and
transmitting said clip to a second computing device via said social network, wherein said social network is configured to transmit said clip to said second computing device using an SMS or MMS message;
wherein said clip serves as a personal identifier for said first computing device when said clip is played on said second computing device.

2. The method of claim 1, further comprising:
providing to said second computing device via said social network at least one of an option to purchase said clip, an option to purchase said full piece of content from which said clip was generated, and an option to generate a second clip.

3. The method of claim 1, wherein:
said clip is played on said second computing device as an alert when said first computing device contacts said second computing device; and
the method further comprises:
transmitting an updated clip to said second computing device via said social network upon said first computing device updating said identifier for said first computing device, wherein said updated clip serves as said updated identifier for said first computing device.

4. The method of claim 1, wherein said clip is played on said second computing device as a ringtone.

5. The method of claim 1, wherein:
said social network publishes information from multiple computing devices;
said clip is an audio/video clip; and
said clip is downloadable from a server.

6. A system for disseminating a clip over a social network, wherein said clip is less than a full piece of content, the system comprising:
a server operating said social network, wherein said server is configured to:
receive a clip generated using a first computing device;
associate said clip with said first computing device; and
transmit said clip over said social network to a second computing device using an SMS or MMS message;
wherein said clip serves as a personal identifier for said first computing device when said clip is played on said second computing device.

7. The system of claim 6, wherein:
said clip is played on said second computing device as an alert when said first computing device contacts said second computing device;

said second computing device is configured to play said clip as a ringtone;

said server is further configured to transmit an updated clip to said second computing device over said social network upon said first computing device updating said identifier for said first computing device, wherein said updated clip serves as said updated identifier for said first computing device;

said social network publishes information from multiple computing devices;

said clip is an audio/video clip; and said clip is downloadable from said server.

8. A method for automatically propagating a clip to a plurality of computing devices, wherein said clip is less than a full piece of content, the method comprising:

receiving, at a server, said clip generated using a first computing device;

associating, at said server, said clip with said first computing device;

transmitting said clip to a second computing device via said server, wherein said server is configured to transmit said clip to said second computing device using an SMS or MMS message; and transmitting said clip to a third computing device via said server, wherein said server is configured to transmit said clip to said third computing device using a second SMS or MMS message;

wherein at least part of said clip is incorporated in a first application running on said second computing device;

wherein at least part of said clip is incorporated in a second application running on said third computing device; and wherein said clip serves as a personal identifier for said first computing device when said clip is played on at least one of said second computing device and said third computing device.

9. The method of claim 8, wherein each application running on each computing device is a social network website that publishes information from multiple computing devices.

10. The method of claim 8, wherein each application running on each computing device enables use of at least part of said clip as a ring tone on a mobile device.

11. The method of claim 8, wherein:

said clip is played on said second computing device as an alert when said first computing device contacts said second computing device;

said clip is played on said third computing device as an alert when said first computing device contacts said third computing device;

the method further comprises:

transmitting an updated clip to at least one of said second computing device and said third computing device via said server upon said first computing device updating said identifier for said first computing device, wherein said updated clip serves as said updated identifier for said first computing device;

said clip is an audio/video clip; and said clip is downloadable from said server.

12. A system for automatically propagating a clip, wherein said clip is less than a full piece of content, the system comprising:

a server configured to:

receive a clip generated using a first computing device;

associate said clip with said first computing device; and transmit said clip to a second computing device and a third computing device, wherein said server is configured to transmit said clip to said second computing device and said third computing device using an SMS or MMS message;

wherein at least part of said clip is incorporated in a first application running on said second computing device;

wherein at least part of said clip is incorporated in a second application running on said third computing device;

wherein said clip serves as a personal identifier for said first computing device when said clip is played on at least one of said second computing device and said third computing device.

13. The system of claim 12, wherein:

said clip is played on said second computing device as an alert when said first computing device contacts said second computing device;

said clip is played on said third computing device as an alert when said first computing device contacts said third computing device;

said server is further configured to transmit an updated clip to at least one of said second computing device and said third computing device upon said first computing device updating said identifier for said first computing device, wherein said updated clip serves as said updated identifier for said first computing device;

said clip is an audio/video clip; and said clip is downloadable from said server.

14. A method for disseminating a clip to a mobile device, the method comprising:

generating a clip, wherein said clip is less than a full piece of content;

storing said clip on a first computing device; and transmitting said clip to a second computing device via a server, wherein said server is configured associate said clip with said first computing device, and transmit said clip to said second computing device using an SMS or MMS message;

wherein said second computing device is a mobile device;

wherein said second computing device is configured to play said clip on said second computing device; and wherein said clip serves as a personal identifier for said first computing device when said clip is played on said second computing device.

15. The method of claim 14, wherein said message comprises said clip.

16. The method of claim 14, wherein said message comprises a website link for accessing said clip.

17. The method of claim 14, wherein:

said clip is played on said second computing device as an alert when said first computing device contacts said second computing device;

said second computing device receives an updated clip from said server in response to said first computing device updating said identifier for said first computing device, wherein said updated clip serves as said updated identifier for said first computing device;

said second computing device is configured to play said clip on said second computing device as a ringtone;

said clip is an audio/video clip; and said clip is downloadable from said server.

18. A system for disseminating a clip to a mobile device, wherein the clip is less than a full piece of content, the system comprising:

a first computing device configured to generate and store a clip; and a second computing device coupled to said first computing device over a social network, wherein said social network is configured to associate said clip with said first computing device, and wherein said first computing device is configured to transmit said clip over said social network to said second computing device using an SMS or MMS message;

wherein said second computing device is a mobile device; and wherein said clip serves as a personal identifier for said first computing device when said clip is played on said second computing device.

19. The system of claim 18, wherein:

said second computing device receives an updated clip from said social network in response to said first computing device updating said identifier for said first computing device, wherein said updated clip serves as said updated identifier for said first computing device;

said second computing device is configured to play said clip as a ringtone;

said clip is an audio/video clip; and said clip is downloadable from a server.

20. A method for disseminating a clip from a mobile device, the method comprising:

generating a clip, wherein said clip is less than a full piece of content;

storing said clip on a first computing device, wherein said first computing device is a mobile device; and transmitting said clip to a second computing device over a social network, wherein said social network is configured to associate said clip with said first computing device, and transmit said clip to said second computing device using an SMS or MMS message;

wherein said clip serves as a personal identifier for said first computing device when said clip is played on said second computing device.

21. The method of claim 20, wherein said message comprises said clip.

22. The method of claim 20, wherein said message comprises a website link for accessing said clip.

23. The method of claim 20, wherein:

said clip is played on said second computing device as an alert when said first computing device contacts said second computing device;

said second computing device receives an updated clip from said social network in response to said first computing device updating said identifier for said first computing device, wherein said updated clip serves as said updated identifier for said first computing device;

said second computing device is configured to play said clip as a ringtone;

said clip is an audio/video clip; and said clip is downloadable from a server.

24. A system for disseminating a clip to a mobile device, wherein said clip is less than a full piece of content, the system comprising:

a first computing device configured to generate and store a clip, wherein said first computing device is a mobile device; and a second computing device coupled to said first computing device via a server, wherein said server is configured to associate said clip with said first computing device, and transmit said clip to said second computing device using an SMS or MMS message;

wherein said clip serves as a personal identifier for said first computing device when said clip is played on said second computing device.

25. The system of claim 24, wherein:

said clip is played on said second computing device as an alert when said first computing device contacts said second computing device;

said second computing device receives an updated clip from said server in response to said first computing device updating said identifier for said first computing device, wherein said updated clip serves as said updated identifier for said first computing device;

said second computing device is configured to play said clip as a ringtone;

said clip is an audio/video clip; and said clip is downloadable from said server.

26. A method for disseminating a clip over a social network, the method comprising:

receiving, at a first computing device, a clip transmitted via said social network, wherein said social network is configured to associate said clip with a second computing device, and wherein said social network is further configured to transmit said clip to said first computing device using an SMS or MMS message; and playing said clip on said first computing device, wherein said clip serves as a personal identifier for said second computing device when said clip is played on said first computing device.

27. The method of claim 26, further comprising:

providing, on said first computing device, via said social network at least one of an option to purchase said clip, an option to purchase said full piece of content from which said clip was generated, and an option to generate a second clip.

28. The method of claim 26, further comprising:

playing said clip on said first computing device as an alert upon said second computing device contacting said first computing device; and receiving, at said first computing device, an updated clip via said social network upon said second computing device updating said identifier for said second computing device, wherein said updated clip serves as said updated identifier for said second computing device.

29. The method of claim 26, wherein said clip is played on said first computing device as a ringtone.

30. The method of claim 26, wherein:

said social network publishes information from multiple computing devices;

said clip is an audio/video clip; and said clip is downloadable from a server.

31. A system for disseminating a clip over a social network, wherein said clip is less than a full piece of content, the system comprising:

a first computing device configured to:

receive a clip transmitted via said social network, wherein said social network is configured to associate said clip with a second computing device, and wherein said social network is further configured to transmit said clip to said first computing device using an SMS or MMS message; and play said clip on said first computing device, wherein said clip serves as a personal identifier for said second computing device when said clip is played on said first computing device.

32. The system of claim 31, wherein:

said first computing device if further configured to:

play said clip on said first computing device as an alert when said second computing device contacts said first computing device;

play said clip as a ringtone; and receive an updated clip over said social network upon said second computing device updating said identifier for said second computing device, wherein said updated clip serves as said updated identifier for said second computing device;

said social network publishes information from multiple computing devices;

said clip is an audio/video clip; and said clip is downloadable from said server.

33. A method for propagating a clip, wherein said clip is less than a full piece of content, the method comprising:

receiving, at a first computing device, a clip transmitted via a server, wherein said server is configured to associate said clip with a second computing device, and wherein said server is further configured to transmit said clip to said first computing device using an SMS or MMS message; and incorporating at least part of said clip in a first application running on said first computing device;

wherein said clip serves as a personal identifier for said second computing device when said clip is played on said first computing device.

34. The method of claim 33, wherein said first application running on said first computing device is a social network website that publishes information from multiple computing devices.

35. The method of claim 33, wherein said first application running on said first computing device enables use of at least part of said clip as a ring tone on a mobile device.

36. The method of claim 33, further comprising:

playing said clip on said first computing device as an alert when said second computing device contacts said first computing device; and receiving, at said first computing device, an updated clip via said social network upon said second computing device updating said identifier for said second computing device, wherein said updated clip serves as said updated identifier for said second computing device;

wherein said clip is an audio/video clip; and wherein said clip is downloadable from said server.

37. A system for propagating a clip, wherein said clip is less than a full piece of content, the system comprising:

a first computing device configured to:

receive, at a first computing device, a clip transmitted via a server, wherein said server is configured to associate said clip with a second computing device, and wherein said server is further configured to transmit said clip to said first computing device using an SMS or MMS message; and incorporate at least part of said clip in a first application running on said first computing device;

wherein said clip serves as a personal identifier for said second computing device when said clip is played on said first computing device.

38. The system of claim 37, wherein:

said first computing device is further configured to:

play said clip on said first computing device as an alert when said second computing device contacts said first computing device; and receive, at said first computing device, an updated clip via said social network upon said second computing device updating said identifier for said second computing device, wherein said updated clip serves as said updated identifier for said second computing device;

said clip is an audio/video clip; and said clip is downloadable from said server.

* * * * *